US012685240B2

(12) United States Patent
Carrick et al.

(10) Patent No.: US 12,685,240 B2
(45) Date of Patent: Jul. 21, 2026

(54) METHOD AND APPARATUS FOR OPERATING A PLANTER GAUGE WHEEL ARM

(71) Applicant: G.B.G.I., Inc., Chardon, OH (US)

(72) Inventors: William Carrick, Chardon, OH (US); Peter T. Casamento, Solon, OH (US)

(73) Assignee: G.B.G.I., Inc., Chardon, OH (US)

( * ) Notice: Subject to any disclaimer, the term of this patent is extended or adjusted under 35 U.S.C. 154(b) by 458 days.

(21) Appl. No.: 18/341,846

(22) Filed: Jun. 27, 2023

(65) Prior Publication Data

US 2024/0224832 A1 Jul. 11, 2024

Related U.S. Application Data

(60) Provisional application No. 63/479,284, filed on Jan. 10, 2023.

(51) Int. Cl.
| | |
|---|---|
| *A01B 63/00* | (2006.01) |
| *A01B 35/16* | (2006.01) |
| *A01B 71/04* | (2006.01) |
| *A01C 5/06* | (2006.01) |

(52) U.S. Cl.
CPC ............ *A01B 63/008* (2013.01); *A01B 35/16* (2013.01); *A01B 71/04* (2013.01); *A01C 5/064* (2013.01)

(58) Field of Classification Search
CPC ......... A01B 35/16; A01B 71/02; A01B 71/04; A01B 71/08; A01B 63/008; A01C 5/064
See application file for complete search history.

(56) References Cited

U.S. PATENT DOCUMENTS

| | | | | |
|---|---|---|---|---|
| 5,802,995 | A * | 9/1998 | Baugher | A01C 7/205 |
| | | | | 111/140 |
| 6,321,667 | B1 * | 11/2001 | Shoup | A01C 5/068 |
| | | | | 111/164 |
| 10,327,372 | B2 | 6/2019 | Kester | |
| 10,798,864 | B2 * | 10/2020 | Salowitz | A01B 63/006 |
| 2005/0072344 | A1 * | 4/2005 | Kester | A01C 5/066 |
| | | | | 111/135 |
| 2014/0352991 | A1 * | 12/2014 | Patwardhan | A01C 5/066 |
| | | | | 172/773 |
| 2015/0230392 | A1 * | 8/2015 | Schafer | A01C 7/203 |
| | | | | 172/773 |
| 2016/0097423 | A1 * | 4/2016 | Hauck | F16C 25/083 |
| | | | | 384/570 |
| 2017/0156254 | A1 * | 6/2017 | Kester | A01C 5/068 |
| 2017/0202130 | A1 * | 7/2017 | Schoolman | A01B 71/04 |
| 2018/0228076 | A1 * | 8/2018 | Sivinski | A01B 63/163 |
| 2019/0313566 | A1 * | 10/2019 | Salowitz | A01B 63/006 |
| 2019/0350120 | A1 * | 11/2019 | Steinke | A01C 7/201 |
| 2024/0065133 | A1 * | 2/2024 | Martin | A01B 63/163 |

* cited by examiner

*Primary Examiner* — Jamie L McGowan

(74) *Attorney, Agent, or Firm* — Sand, Sebolt & Wernow Co., LPA

(57) ABSTRACT

A gauge wheel arm assembly equipped to a row unit planter. The gauge wheel arm assembly may include an arm portion and a hub portion operably engaged with the arm portion for receiving at least two bearings. The hub portion may include at least one stop portion configured to operably engaged with a first bearing of the at least two bearings. The hub portion may also include at least another stop portion configured to operably engaged with a second bearing of the at least two bearings. The at least one stop portion of the hub portion and the at least another stop portion of the hub portion are independent and separate from one another.

19 Claims, 6 Drawing Sheets

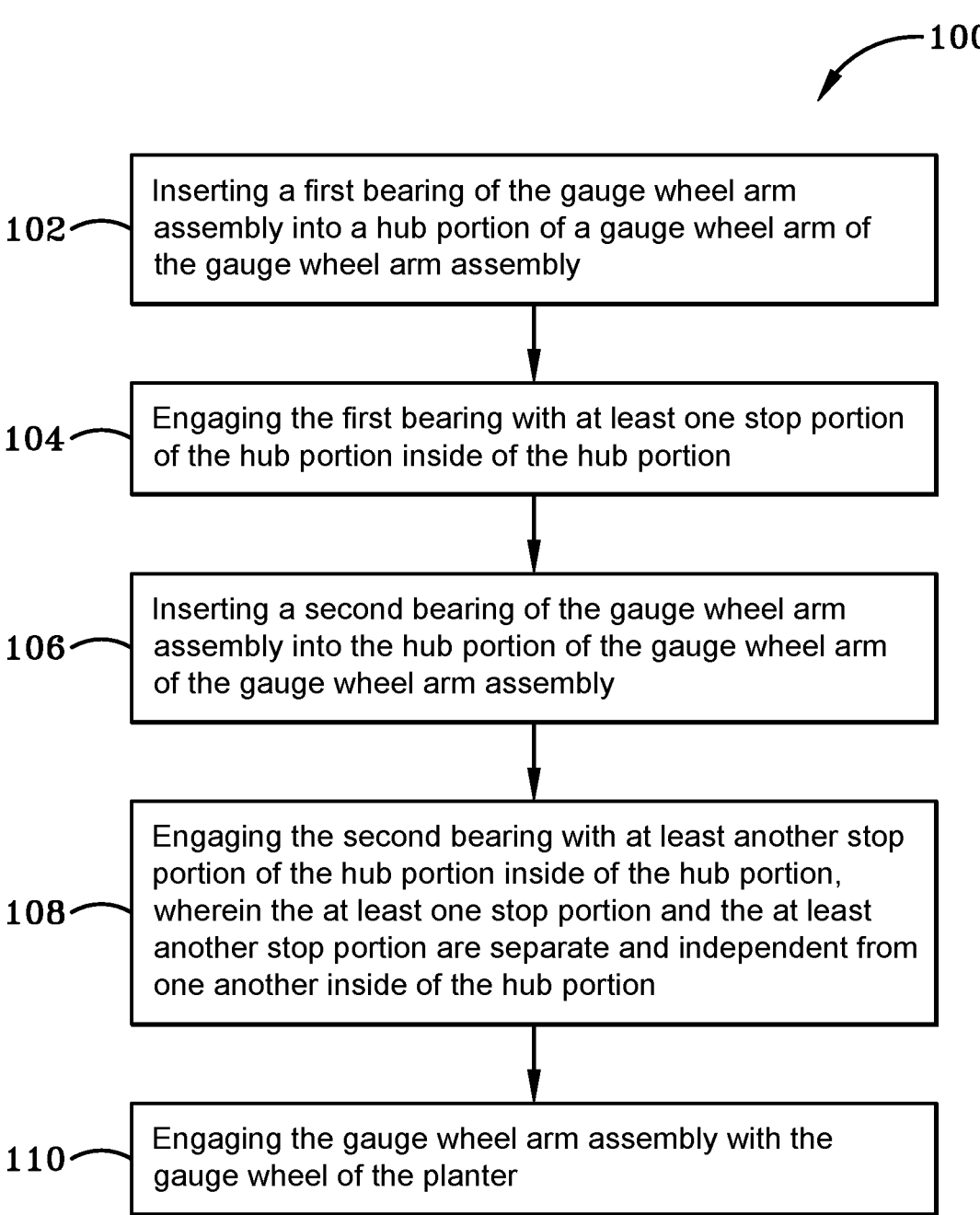

┌100

102 — Inserting a first bearing of the gauge wheel arm assembly into a hub portion of a gauge wheel arm of the gauge wheel arm assembly 104 — Engaging the first bearing with at least one stop portion of the hub portion inside of the hub portion 106 — Inserting a second bearing of the gauge wheel arm assembly into the hub portion of the gauge wheel arm of the gauge wheel arm assembly 108 — Engaging the second bearing with at least another stop portion of the hub portion inside of the hub portion, wherein the at least one stop portion and the at least another stop portion are separate and independent from one another inside of the hub portion 110 — Engaging the gauge wheel arm assembly with the gauge wheel of the planter

FIG.6

METHOD AND APPARATUS FOR OPERATING A PLANTER GAUGE WHEEL ARM

REFERENCE TO RELATED APPLICATIONS

This application claims the benefit of U.S. Provisional Application Ser. No. 63/479,284, filed on Jan. 10, 2023; the disclosure of which is incorporated herein by reference.

TECHNICAL FIELD

This disclosure is directed to a gauge wheel arm assembly equipped to a row unit planter.

BACKGROUND ART

In current farming operations, row unit planters or row crop planters are generally used to plant seeds in wider rows than other conventional farming implements such as grain drills. Generally, these planters include various components and attachments for planting seeds, including a hopper, a metering unit, a seed tube, a furrow opener, opening blades, and closing or press wheels. To maintain a desired planting depth in the soil for planting seeds, gauge wheels are generally provided with these planters as these planters traverse across undulating terrain in a field. However, such positioning of these gauge wheels can be difficult to combat given the terrain of specific fields in which these planters are being used.

To combat this issue, a gauge wheel arm assembly may be operably engaged with the gauge wheel to enable quick depth adjustment of said gauge wheel. Generally, these gauge wheel arms are also operably engaged with a lower shank of the planter to provide an interconnection between the lower shank and the gauge arm for setting a desired planting depth. However, due to repetitive use and harsh terrain conditions, these gauge wheel arm assemblies may warp and/or deteriorate such that the gauge wheel arm is unable to provide a consistent height of the gauge wheel during planting operations. Moreover, these planters use proprietary equipment, including gauge wheel arm assemblies, that are specific to each planter. With such specificities, owners of different types of planters that include gauge wheel arm assemblies must be equipped with different versions of these gauge wheel arm assemblies when components and/or parts of a specific gauge wheel arm assembly is damaged. In turn, owners of different types of planters must incur additional costs during each planting season to assure a specific gauge wheel arm assembly is fixed with the proper part and/or component.

SUMMARY OF THE INVENTION

The presently disclosed gauge wheel arm assembly may include a gauge wheel arm and a hub portion that operably engages with the gauge wheel arm. The presently disclosed hub portion may include at least two stop portions that are spaced apart from one another where a first stop portion of the at least two stop portions engages with a first bearing and a second stop portion of the at least two stop portions engages with a second bearing. The presently disclosed gauge wheel arm assembly may also include a bearing spacer positioned between the at least two stop portions and configured to operably engage with the two bearings to separate the two bearings. The presently disclosed gauge wheel arm assembly addresses some inadequacies in conventional gauge wheel arm assemblies.

In one aspect, an exemplary embodiment of the present disclosure may provide a gauge wheel arm assembly. The gauge wheel arm assembly may include an arm portion. The gauge wheel arm assembly may also include a hub portion that is operably engaged with the arm portion for receiving at least two bearings. The hub portion may include at least one stop portion configured to operably engaged with a first bearing of the at least two bearings. The hub portion may further include at least another stop portion configured to operably engaged with a second bearing of the at least two bearings. The at least one stop portion and the at least another stop portion of the hub portion are independent and separate from one another.

This exemplary embodiment or another exemplary embodiment may further include a bearing spacer positioned between the at least one stop portion and the at least another stop portion; wherein the bearing spacer is configured to operably engaged with the at least two bearings inside of the hub portion. This exemplary embodiment or another exemplary embodiment may further include that the bearing spacer comprises: an upper engagement surface configured to engage with the first bearing of the at least two bearings; and a lower engagement surface opposite to the upper engagement surface and configured to engaged with the second bearing of the at least two bearings. This exemplary embodiment or another exemplary embodiment may further include that the hub portion comprises: a central gap defined between the at least one stop portion and the at least another stop portion; wherein the at least one stop portion and the at least another stop portion are separated from one another at the central gap. This exemplary embodiment or another exemplary embodiment may further include that the hub portion comprises: a first outer stop surface defined on the at least one stop portion; and a first inner stop surface defined on the at least one stop portion opposite to the first outer stop surface; wherein the first outer stop surface is configured to engage with the first bearing of the at least two bearings. This exemplary embodiment or another exemplary embodiment may further include that the hub portion comprises: a second outer stop surface defined on the at least another stop portion and facing away from the first outer stop surface; and a second inner stop surface defined on the at least one another portion opposite to the second outer stop surface and facing towards the first inner stop surface; wherein the second outer stop surface is configured to engage with the second bearing of the at least two bearings. This exemplary embodiment or another exemplary embodiment may further include that the hub portion comprises: a central gap defined between the first inner stop surface of the at least one stop portion and the second inner stop surface of the at least another stop portion; wherein the first inner stop surface and the second inner stop surface are separated from one another at the central gap. This exemplary embodiment or another exemplary embodiment may further include that the hub portion further comprises: a top end; a bottom end vertically opposite to the top end; an inner circumferential wall extending between the top end and the bottom end; and a first bore defined by the inner circumferential wall and extends between the top end and the at least one stop portion; wherein the first bore is configured to receive the first bearing of the at least two bearings. This exemplary embodiment or another exemplary embodiment may further include that the inner circumferential wall is continuous and uninterrupted between the top end and the bottom end. This exemplary embodiment or another exemplary embodiment may further include that the hub portion further comprises: a second bore defined by the inner circumferential wall and extends between the bottom end and the at least another stop portion; wherein the second bore is defined vertically below the first bore; and wherein the second bore is configured to receive the second bearing of the at least two bearings. This exemplary embodiment or another exemplary embodiment may further include that the hub portion further comprises: a third bore defined by the at least one stop portion and the at least another stop portion; wherein the third bore is defined between the first bore and the second bore; and wherein the third bore is configured to receive a portion of the first bearing, a portion of the second bearing, and the bearing spacer. This exemplary embodiment or another exemplary embodiment may further include that the first bearing is a single row bearing configured to be received by the first bore; and wherein the second bearing is a double row bearing configured to be received by the second bore. This exemplary embodiment or another exemplary embodiment may further include that the hub portion further comprises: a first length of the first bore defined between the top end and the at least one stop portion; and a second length of the second bore defined between the bottom end and the at least another stop portion; wherein the second length is greater than the first length. This exemplary embodiment or another exemplary embodiment may further include a first end of the arm portion operably engaged with the hub portion; a second end of the arm portion opposite to the first end of the arm portion and operably engaged with the hub portion; and a threaded passageway defined at the first end of the arm portion. This exemplary embodiment or another exemplary embodiment may further include that the arm portion further comprises: a first arm section extending from the first end and towards the second end of the arm portion; a second arm section extending from the first arm section and towards the second end of the arm portion; a third arm section extending from the second arm section and towards the second end of the arm portion and being positioned above the first arm section; a fourth arm section extending from the third arm section to the second end of the arm portion; a fifth arm section extending from the fourth arm section and towards the second end of the arm portion and being positioned below the first arm section and the third arm section; and a sixth arm section extending from the fifth arm section to the second end of the arm portion and being operably engaged with the hub portion.

In another aspect, an exemplary embodiment of the present disclosure may provide a method of engaging a gauge wheel arm assembly with a gauge wheel of a planter. The method may comprise steps of: inserting a first bearing of the gauge wheel arm assembly into a hub portion of a gauge wheel arm of the gauge wheel arm assembly; engaging the first bearing with at least one stop portion of the hub portion inside of the hub portion; inserting a second bearing of the gauge wheel arm assembly into the hub portion of the gauge wheel arm of the gauge wheel arm assembly; engaging the second bearing with at least another stop portion of the hub portion inside of the hub portion, wherein the at least one stop portion and the at least another stop portion are separate and independent from one another inside of the hub portion; and engaging the gauge wheel arm assembly with the gauge wheel of the planter.

This exemplary embodiment or another exemplary embodiment may further include steps of inserting a bearing spacer of the gauge wheel arm assembly into the hub portion of the gauge wheel arm; and engaging the first bearing and the second bearing with the bearing spacer. This exemplary embodiment or another exemplary embodiment may further include a step of spacing the first bearing and the second bearing away from one another via a central gap defined between the at least one stop portion and the at least another stop portion. This exemplary embodiment or another exemplary embodiment may further include that the step of engaging the first bearing with the at least one stop portion of the hub portion inside of the hub portion further includes that the first bearing engages with a first outer stop surface of the at least one stop portion; and wherein the step of engaging the second bearing with the at least another stop portion of the hub portion inside of the hub portion further includes that the second bearing engages with a second outer stop surface of the at least another stop portion separate and independent of the first outer surface. This exemplary embodiment or another exemplary embodiment may further include that wherein the first bearing is a single row bearing; and wherein the second bearing is a double row bearing.

BRIEF DESCRIPTION OF THE DRAWINGS

Sample embodiments of the present disclosure are set forth in the following description, are shown in the drawings and are particularly and distinctly pointed out and set forth in the appended claims.

FIG. 6 is a method flowchart for engaging a gauge wheel arm assembly with a gauge wheel of a planter.

Similar numbers refer to similar parts throughout the drawings.

DETAILED DESCRIPTION

Figure 1:
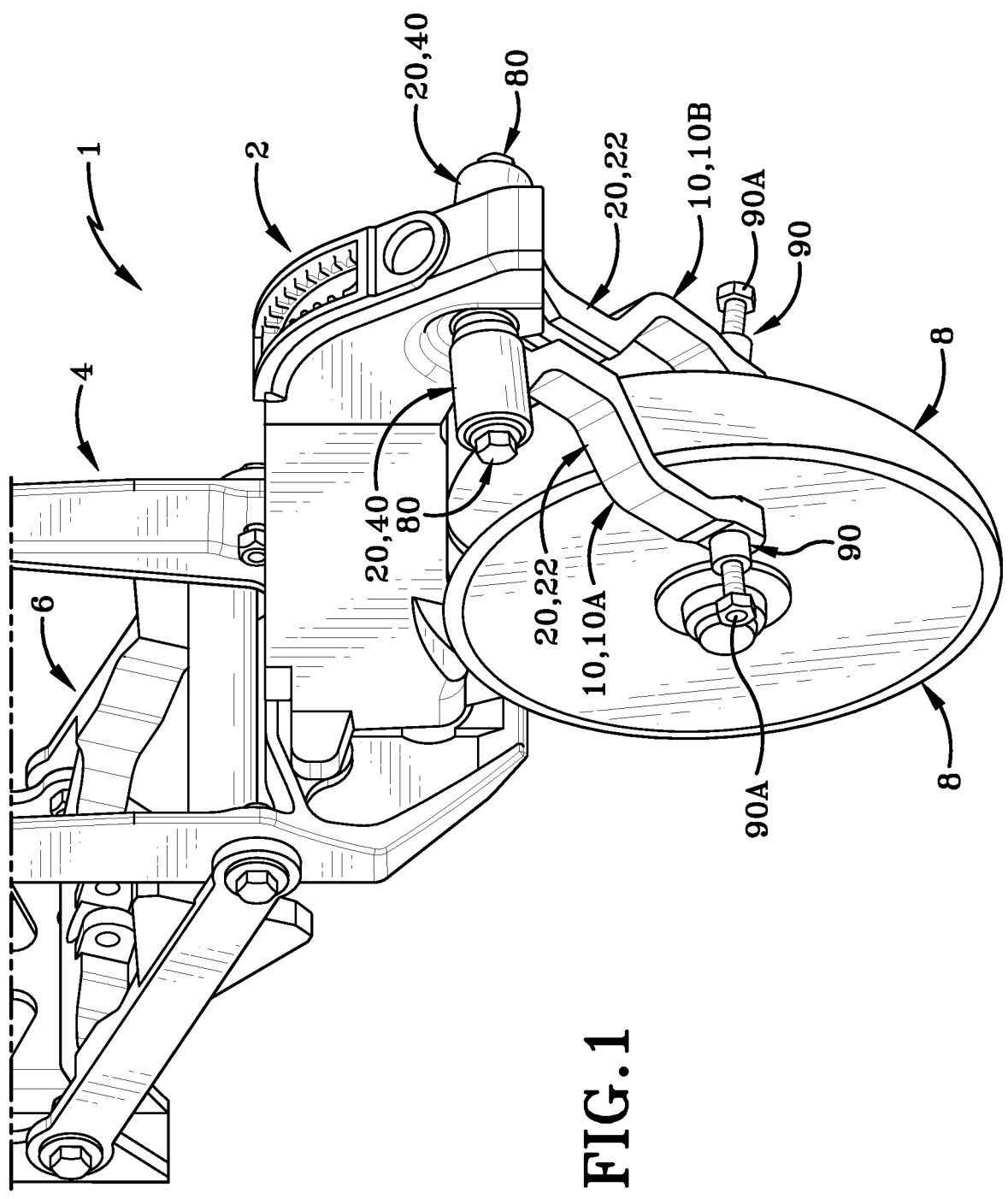
FIG. 1 is partial top, rear, right side isometric perspective view of a row unit planter, wherein the row unit planter includes a gauge wheel arm assembly in accordance with one aspect of the present disclosure.

FIG. 1 illustrates a row unit planter or row unit generally referred to as 1. The row unit 1 includes a lower shank 2 that operably engages with the head frame 4. While not illustrated herein, the lower shank 2 may be configured to maintain and hold a hopper assembly and other suitable devices of the like for carrying seed for row unit 1. Row unit 1 may also include a parallel linkage assembly 6 that operably engages with the head frame 4. While also not illustrated herein, parallel linkage assembly 6 operably engages the row unit 1 with a main frame of a seeding machine or planting machine where a plurality of row units 1 are operably engaged with the main frame.

Still referring to FIG. 1, row unit 1 may also include a pair of opening wheels or blades 8 operably engaged with the lower shank 2 where the pair of opening wheels 8 are configured to create a seed furrow in a ground surface of a field. Row unit 1 also includes at least one gauge arm assembly or gauge wheel arm assembly (hereinafter "assembly"), generally referred to as numeral 10, that operably engages with the lower shank 2. Assembly 100 is configured to maintain a gauge wheel (not illustrated herein) of row unit 1 at a desired position relative to opener blades 8 of the row unit 1 to provide desired depth of planting and/or sowing seeds into the ground surface. By maintaining the gauge wheel of the row unit 1 at a desired position relative to opener blades 8 of the row unit planter, the assembly 100 prevents critical issues and/or malfunctions to occur to the row unit planter during planting operations, including preventions of plugging the row unit planter and deteriorating the seed furrow. Such components and elements of assembly 100 are described in greater detail below.

It should be understood that any suitable number of assemblies 10 may be operably engaged with the lower shank 2 based on various considerations, including the number of gauge wheels to be included with a row unit. In the illustrated embodiment, two assemblies 10A, 10B may be operably engaged with the lower shank to maintain two gauge wheels provided with row unit 1 to maintain a desired depth of planting and/or sowing seeds into the ground surface.

Figure 2:
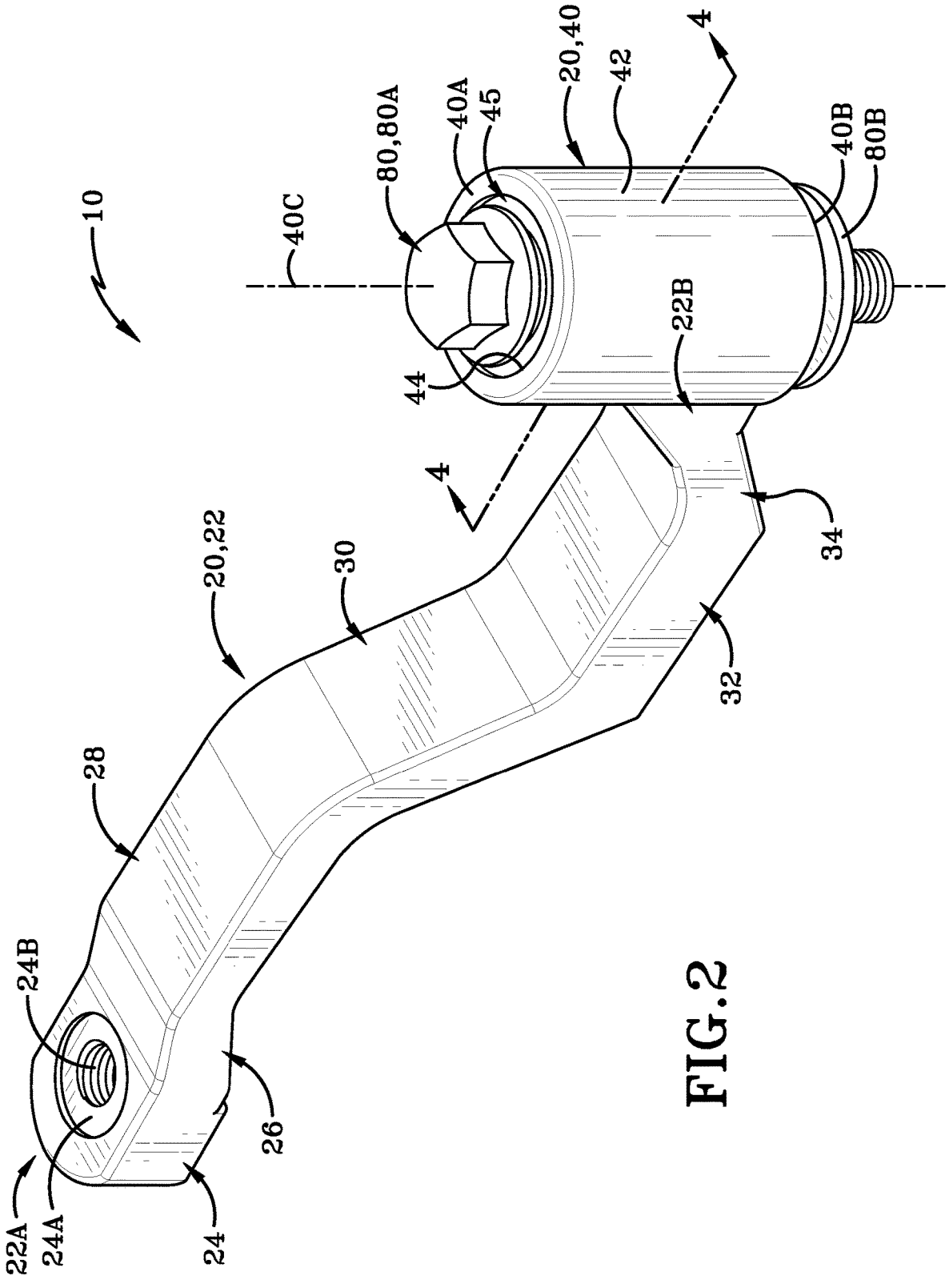
FIG. 2 is a top, front, right side isometric perspective view of the gauge wheel arm assembly shown in FIG. 1.

Assembly 10 includes a gauge arm or gauge wheel arm 20 having an arm portion 22. As best seen in FIG. 2, the arm portion 22 includes a first end 22A, a second end 22B opposite to the first end 22A, and a longitudinal axis defined therebetween. The arm portion 22 may also include one or more arm sections that collectively form the arm portion 22, which is described in more detail below.

As best seen in FIG. 2, arm portion 22 may include a first arm section 24 that extends longitudinally from the first end 22A and towards the second end 22B. The first arm section 24 may also define a recessed portion 24A that extends vertically downward into the first arm section 24. The first arm section 24 may also define a threaded passageway 24B that extends entirely through the first arm section 24 along an axis that is orthogonal to the longitudinal axis of arm portion 22. In the illustrated embodiment, recessed portion 24A is defined vertically above the threaded passageway 24B. Such use and purpose of the recessed portion 24A and the threaded passageway 24B are described in greater detail below.

Arm portion 22 may also include a second arm section 26 that extends from the first arm section 24 and towards the second end 22B where the second arm section 26 is angled upwardly from the first arm section 24. Arm portion 22 may also include a third arm section 28 that extends from the second arm section 26 and towards the second end 22B where the third arm section 28 is positioned substantially parallel with the first arm section 24. Arm portion 22 may also include a fourth arm section 30 that extends from the third arm section 28 and towards the second end 22B where the fourth arm section 30 is angled downwardly from the third arm section 28. Arm portion 22 may also include a fifth arm section 32 that extends from the fourth arm section 30 and towards the second end 22B where the fifth arm section 32 is substantially parallel with the first arm section 24 and the third arm section 28. Arm portion 22 may also include a sixth arm section 34 that extends from the fifth arm section 32 to the second end 22B where the sixth arm section 34 is angled upwardly from the fifth arm section 32.

Each of the first arm section 24, the second arm section 26, the third arm section 28, the fourth arm section 30, the fifth arm section 32, and the sixth arm section 34 may be positioned and/or oriented at any suitable position relative to one another. In one instance, the first arm section 24 is positioned vertically below the third arm section 28 relative to the second arm section 26 that operably engages with the first arm section 24 and the third arm section 28. In the same instance, the third arm section 28 is positioned vertically above the fifth arm section 32 relative to the four arm section 30 that operably engages with the third arm section 28 and the fifth arm section 32.

Gauge arm 20 may also include a hub portion 40 that operably engages with the arm portion 22. More particularly, the hub portion 40 operably engages with the sixth arm section 34 at the second end 22B of the arm portion 22. As described in more detail below, hub portion 40 is configured to receive and house at least two bearings where the at least two bearings are spaced apart from one another via at least two stop portions of the hub portion 40. Such components and elements of hub portion 40 are described in more detail below.

Figure 4:
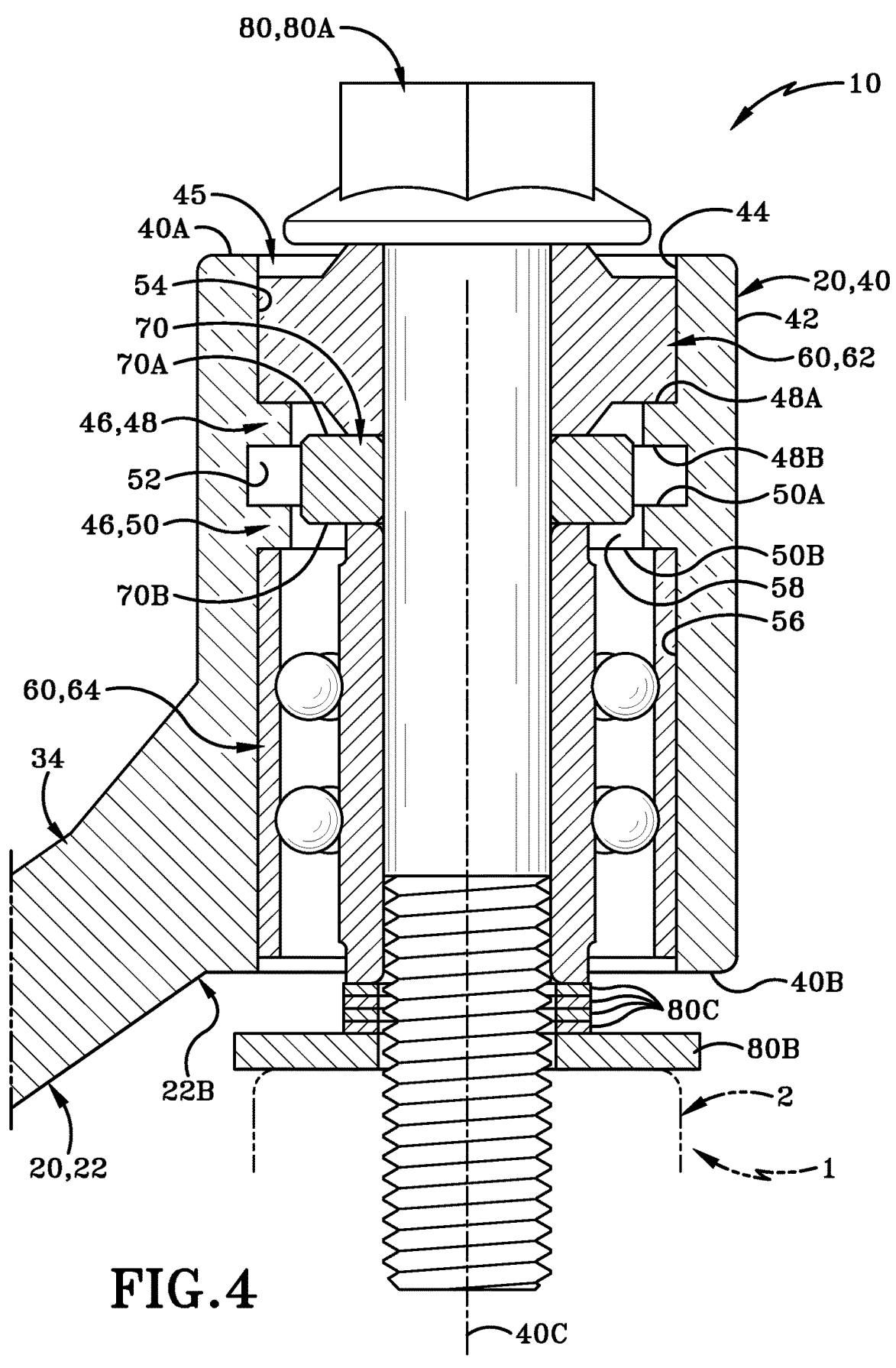
FIG. 4 is a sectional view of the gauge wheel arm assembly taken in the direction of line 4-4 shown in FIG. 2.
Figure 5:
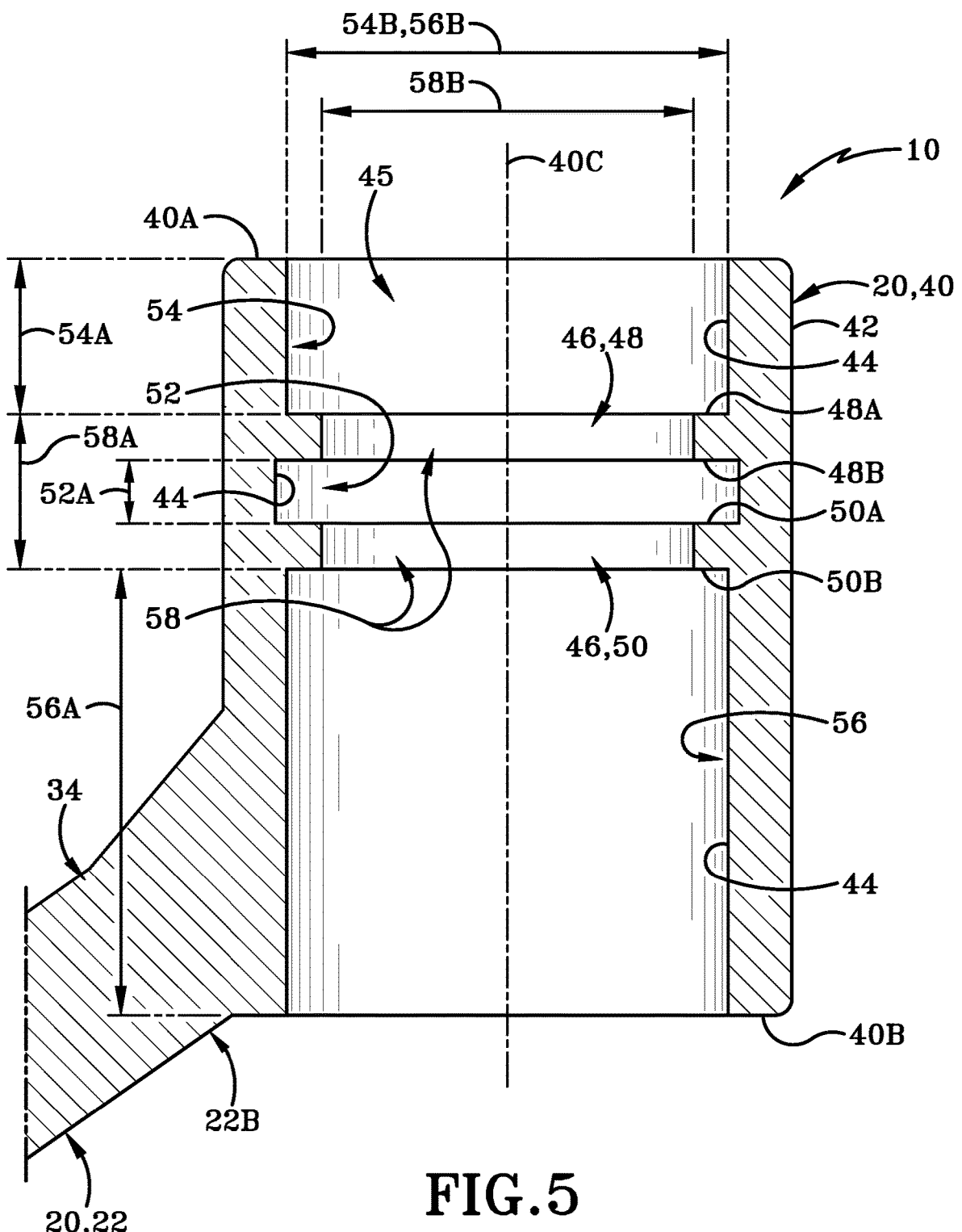
FIG. 5 is a sectional view of the gauge wheel arm assembly similar to FIG. 4, wherein a first bearing, a second bearing, a bearing spacer, and a first attachment assembly are removed from a gauge wheel arm of the gauge wheel arm assembly.

As best seen in FIGS. 4-5, hub portion 40 includes a first or top end 40A, a second or bottom end 40B vertically opposite to the top end 40A, and a vertical axis 40C defined therebetween that is perpendicular with the longitudinal axis of the arm portion 22. Hub portion 40 may also include an outer circumferential wall 42 that extends vertically between the top end 40A and the bottom end 40B. Hub portion 40 may also include an inner circumferential wall 44 that extends vertically between the top end 40A and the bottom end 40B; the inner circumferential wall 44 faces away from the outer circumferential wall 42 and is disposed interior to the outer circumferential wall 42. Inner circumferential wall 44 may also define a main passageway 45. The main passageway 45 extends entirely through the hub portion 40 along the vertical axis 40C of hub portion 40 between the top end 40A and the bottom end 40B. It should be understood that the main passageway 45 is accessible at either the top end 40A or the bottom end 40B given that top end 40A and the bottom end 40B are open ends.

Hub portion 40 may also include at least two stop portions 46 that extend radially from the inner circumferential wall 44 and into the main passageway 45. The at least two stop portions 46 are positioned between the top end 40A and the bottom end 40B of the hub portion 40 along the inner circumferential wall 44. As described in more detail below, the at least two stop portions are separate and independent from one another inside of the hub portion 40.

The hub portion 40 may include a first stop portion 48 that extends radially from the inner circumferential wall 44 and into the main passageway 45. As best seen in FIG. 5, first stop portion 48 is positioned between the top end 40A and the bottom end 40B on the inner circumferential wall 44 where the first stop portion 48 is positioned proximate to the top end 40A. First stop portion 48 may include a first outer stop surface 48A that faces outwardly from the main passageway 45 and in a direction towards the top end 40A. First stop portion 48 may also include a first inner stop surface 48B that faces inwardly towards the main passageway 45 and in a direction towards the bottom end 40B. In the illustrated embodiment, the first outer stop surface 48A and first inner stop surface 48B oppose one another and face in opposite directions. As described in more detail below, the first outer stop surface 48A is configured to engage with a first bearing of the at least two bearings, and the first inner stop surface 48B is configured to be free from engaging a bearing of the at least two bearings.

The hub portion 40 may include a second stop portion 50 that extends radially from the inner circumferential wall 44 and into the main passageway 45. As best seen in FIG. 5, second stop portion 50 is positioned between the top end 40A and the bottom end 40B on the inner circumferential wall 44 where the second stop portion 50 is positioned more proximate to the bottom end 40B. Second stop portion 50 may include a second outer stop surface 50A that faces outwardly from the main passageway 45 and in a direction towards the bottom end 40B. Second stop portion 50 may also include a second inner stop surface 50B that faces in a direction towards the bottom end 40B. In the illustrated embodiment, the second outer stop surface 50A and second inner stop surface 50B oppose one another and face in opposite directions. As described in more detail below, the second outer stop surface 50A is configured to engage with a second bearing of the at least two bearings, and the second inner stop surface 50B is configured to be free from engaging a bearing of the at least two bearings.

It should be understood that the first stop portion 48 and the second stop portion 50 may be provided in any suitable arrangement relative to one another. In the illustrated embodiment, the first stop portion 48 is positioned vertically above the second stop portion 50 relative to the vertical axis 40C of the hub portion 40. Continuing with this embodiment, the first outer stop surface 48A of the first stop portion 48 and the second outer stop surface 50A of the second stop portion 50 face away from one another inside of the main passageway 45. Continuing with this embodiment, the first inner stop surface 48B of the first stop portion 48 and the second inner stop surface 50B of the second stop portion 50 face towards one another inside of the main passageway 45.

Hub portion 40 may also define a central gap 52 defined between at least two stop portions 46 of hub portion 40. As best seen in FIG. 5, central gap 52 is defined between the first stop portion 48 and the second stop portion 50 in which the first stop portion 48 and the second stop portion 50 are spaced apart from one another. More particularly, the central gap 52 is defined between the first inner stop surface 48B of the first stop portion 48 and the second inner stop surface 50B of the second stop portion 50 in which the first inner stop surface 48B and the second inner stop surface 50B are spaced apart from one another. The first stop portion 48 and the second stop portion 50 collectively define a length 52A for central gap 52 which spaces apart first stop portion 48 and second stop portion 50 from one another.

Hub portion 40 also defines a first bore 54. As best seen in FIG. 5, the first bore 54 is defined between the top end 40A of the hub portion 40 and the first stop portion 48. More particularly, the first bore 54 is defined between the top end 40A of the hub portion 40 and the first outer stop surface 48A of first stop portion 48. In this illustrated embodiment, a first length 54A is measured between the top end 40A of the hub portion 40 and the first outer stop surface 48A of first stop portion 48, which defines the length of the first bore 54 (see FIG. 5). In this illustrated embodiment, a first diameter 54B is also defined by the inner circumferential wall 44 continuously from the top end 40A of the hub portion 40 to the first outer stop surface 48A of first stop portion 48, which defines the diameter of the first bore 54 (also see FIG. 5).

Hub portion 40 also defines a second bore 56 that is vertically below the first bore 54. As best seen in FIG. 5, the second bore 56 is defined between the bottom end 40B of the hub portion 40 and the second stop portion 50. More particularly, the second bore 56 is defined between the bottom end 40B of the hub portion 40 and the second outer stop surface 50A of second stop portion 50. In this illustrated embodiment, a second length 56A is measured between the bottom end 40B of the hub portion 40 and the second outer stop surface 50A of second stop portion 50, which defines the length of the second bore 56 (see FIG. 5). In this illustrated embodiment, a second diameter 56B is also defined by the inner circumferential wall 44 continuously from the bottom end 40B of the hub portion 40 to the second outer stop surface 50A of second stop portion 50, which defines the diameter of the second bore 56 (also see FIG. 5).

Hub portion 40 also defines a third bore 58 that is intermediate to and/or defined between the first bore 54 and the second bore 56. As best seen in FIG. 5, the third bore 58 is defined between the first stop portion 48 and the second stop portion 50. More particularly, the third bore 58 is defined between the first inner stop surface 48B of the first stop portion 48 and the second inner stop surface 50B of the second stop portion 50. In this illustrated embodiment, a third length 58A is measured between the first inner stop surface 48B of the first stop portion 48 and the second inner stop surface 50B of the second stop portion 50, which defines the length of the third bore 58 (see FIG. 5). In this illustrated embodiment, a third diameter 58B is also defined by the first stop portion 48 and the second stop portion 50, which defines the diameter of the third bore 58 (see FIG. 5).

In the illustrated embodiment, lengths and diameters defining the first bore 54, the second bore 56, and the third bore 58 may be equal and/or different to one another. In the illustrated embodiment, second length 56A defining the second bore 56 is greater than the first length 54A defining the first bore 54 and the third length 58A defining the third bore 58, and the first length 54A defining the first bore 54 is greater than the third length 58A defining the third bore 58. In the illustrated embodiment, the first diameter 54B defining the first bore 54 and the second diameter 56B defining the second bore 56 is greater than the third diameter 58B defining the third bore 58. In other exemplary embodiments, any bores defined in a hub portion may be defined by any suitable lengths and diameters dictated by the implementations of a gauge arm. It should also be understood that the first bore 54, the second bore 56, and the third bore 58 collectively make up the main passageway 45 that extends entirely through the hub portion 40.

Assembly 10 may also include at least one bearing 60. The at least one bearing 60 is to be received by the hub portion 40 and to be operably engaged with the at least one stop portion 46. In one instance, a first or upper bearing 62 is to be received by the hub portion 40 and to be operably engaged with the first stop portion 48. As best seen in FIG. 4, the upper bearing 62 is received inside of first bore 54 of the hub portion 40 and operably engages with the first outer stop surface 48A of the first stop portion 48. It should be appreciated that upper bearing 62 may be any suitable bearing that is configured to be received inside of first bore 54 of the hub portion 40 and to be operably engaged with the first stop portion 48. In the illustrated embodiment, the upper bearing 62 is a sealed, single row bearing that is to be received inside of first bore 54 of the hub portion 40 and to be operably engaged with the first stop portion 48. As described in more detail below, the upper bearing 62 provides rotational support to a bolt of an attachment assembly of the assembly 10 to enable the gauge arm 20 to freely pivot about the bolt during planting operations.

In this same instance, a second or lower bearing 64 is to be received by the hub portion 40 and to be operably engaged with the second stop portion 50. As best seen in FIG. 4, the lower bearing 64 is received inside of second bore 56 of the hub portion 40 and operably engages with the second outer stop surface 50A of the second stop portion 50. It should be appreciated that lower bearing 64 may be any suitable bearing that is configured to be received inside of second bore 56 of the hub portion 40 and to be operably engaged with the second stop portion 50. In the illustrated embodiment, the lower bearing 64 is a sealed, double row bearing that is to be received inside of second bore 56 of the hub portion 40 and to be operably engaged with the second stop portion 50. As described in more detail below, the lower bearing 64 also provides rotational support to a bolt of an attachment assembly of the assembly 10 to enable the gauge arm 20 to freely pivot about the bolt during planting operations.

Figure 3:
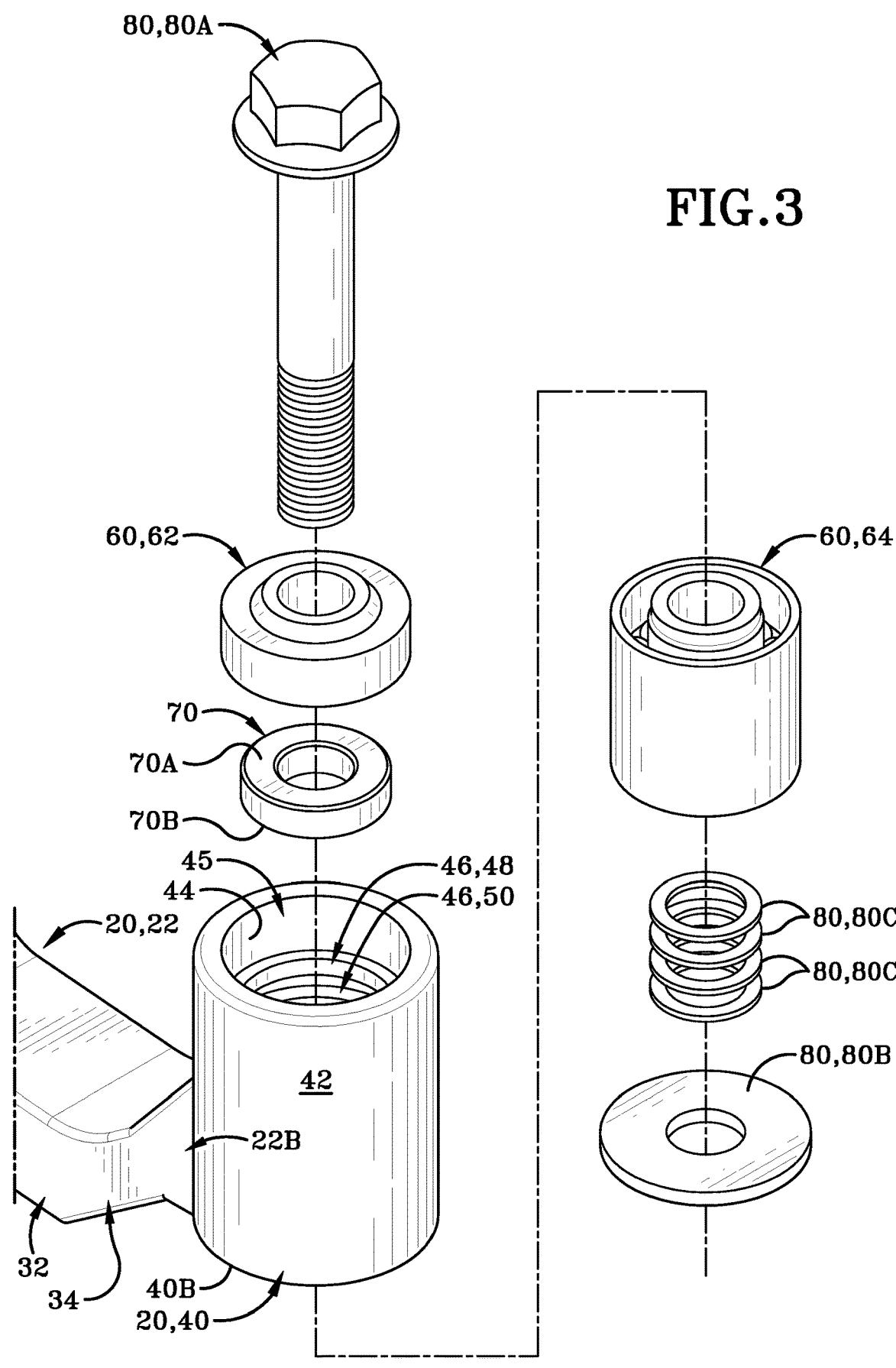
FIG. 3 is an exploded view of the gauge wheel arm assembly shown in FIG. 2.

Assembly 10 may also include at least one bearing spacer 70 that operably engages with the upper bearing 62 and the lower bearing 64. As best seen in FIG. 5, a single bearing spacer 70 is positioned inside of the third bore 58 and operably engages with the upper bearing 62 and the lower bearing 64 such that the bearing spacer 70 is positioned between the upper bearing 62 and the lower bearing 64. As seen in FIGS. 3 and 4, bearing spacer 70 defines an upper engagement surface 70A that operably engages with the upper bearing 62. As also seen in FIGS. 3 and 4, bearing spacer 70 defines a lower engagement surface 70B opposite to the upper engagement surface 70A and operably engages with the lower bearing 64. As best seen in FIG. 4, the bearing spacer 70 is suspended inside of the hub portion 40 by engaging with the upper bearing 62 and the lower bearing 64. It should be appreciated that the bearing spacer 70 may be free from operably engaging with the hub portion 40, particularly the first stop portion 48 and the second stop portion 50, when engaging with the upper bearing 62 and the lower bearing 64.

Upon assembly, the upper bearing 62 and the lower bearing 64 may be operably engaged with at least one component and/or element of hub portion 40 and the bearing spacer 70. With respect to the upper bearing 62, upper bearing 62 may be configured to collectively operably engage with the inner circumferential wall 44, the first stop portion 48, and the bearing spacer 70. More particularly, upper bearing 62 may be configured to collectively operably engage with the inner circumferential wall 44, the first outer stop surface 48A of first stop portion 48, and the upper engagement surface 70A of bearing spacer 70. With respect to the lower bearing 64, lower bearing 64 may be configured to collectively operably engage with the inner circumferential wall 44, the second stop portion 50, and the bearing spacer 70. More particularly, lower bearing 64 may be configured to collectively operably engage with the inner circumferential wall 44, the second outer stop surface 50A of second stop portion 50, and the lower engagement surface 70B of bearing spacer 70.

The upper bearing 62 and the lower bearing 64 may operably engage with the hub portion 40 and the bearing spacer 70 in any suitable attachment configuration to maintain the upper bearing 62 and the lower bearing 64 inside of the hub portion 40. In one example, the upper bearing 62 and the lower bearing 64 may be pressed fitted into the hub portion 40 and may directly abut the bearing spacer 70 inside of the hub portion 40 to maintain the upper bearing 62 and the lower bearing 64 inside of the hub portion 40.

Assembly 10 may also include a first attachment assembly 80 that operably engages the gauge arm 20 with lower shank 2 of row unit 1. First attachment assembly 80 may include a bolt 80A that passes through the hub portion 40, the upper bearing 62, the lower bearing 64, and the bearing spacer 70. As best seen in FIG. 4, bolt 80A threadably engages with lower shank 2 of row unit 1 to collectively operably engage the gauge arm 20, the upper bearing 62, the lower bearing 64, and the bearing spacer 70 with the lower shank 2 of the row unit 1.

First attachment assembly 80 may also include at least one washer 80B that is positioned on the bolt 80A and positioned between the hub portion 40 and lower shank of row unit 1. More particularly, the at least one washer 80B is positioned on the bolt 80A and positioned between the bottom end 40B of hub portion 40 and the lower shank 2 of row unit 1. First attachment assembly 80 may also include at least one shim 80C that is positioned on the bolt 80A and positioned between the hub portion 40 and washer 80B. More particularly, the at least one shim 80C is positioned on the bolt 80A and positioned between the bottom end 40B of hub portion 40 and the washer 80B.

It should be understood that the use of the at least one washer 80B and the at least one shim 80C enables an operator to position the gauge arm at a suitable distance away from the lower shank 2 to move and/or shift gauge wheels relative to the lower shank 2 to provide desired depth of planting and/or sowing seeds into the ground. In the illustrated embodiment, a single washer 80B and four shims 80C are used to position the gauge arm 20 at a suitable distance away from the lower shank 2 to move and/or shift gauge wheels relative to the lower shank 2 to provide desired depth of planting and/or sowing seeds into the ground. While a single washer 80B and four shim 80C are illustrated herein, any suitable number of washer and/or shims may be used by an operator to position the gauge arm at a suitable distance away from the lower shank to move and/or shift opener blades relative to the lower shank to provide desired depth of planting and/or sowing seeds into the ground.

Assembly 10 may also include a second attachment assembly 90 that operably engages the gauge arm 20 with a gauge wheel of row unit 1. First attachment assembly 80 may include a bolt 90A that threadably engages with the threaded passageway 24B of arm portion 22 and threadably engages with the gauge wheel of the row unit planter to operably engage the arm portion 22 with the gauge wheel.

Second attachment assembly 90 may also include at least one washer or shim (not illustrated herein) that is positioned on the bolt 90A and positioned between the arm portion 22 and a gauge wheel of a row unit planter. More particularly, the at least one washer or shim may be positioned on the bolt 90A and positioned between the first arm section 24 of arm portion 22 and a gauge wheel of row unit 1. It should be understood that the at least one washer or shim enables an operator to position the gauge arm at a suitable distance from the gauge wheel. It should also be understood that any suitable number of washer or shims may be used by an operator to position the gauge arm at a suitable distance at a suitable distance from the gauge wheel.

Having now described the components of assembly 10, a method of engaging the assembly 10 with a gauge wheel of row unit 1 is described in more detail below.

Initially, desired bearings may be used for assembly 10. In this instance, upper bearing 62 (a sealed, single row bearing) and lower bearing 64 (a sealed, double row bearing) are used with gauge arm 20. Once upper and lower bearings 62, 64 are provided, either one of the upper bearing 62 and the lower bearing 64 may be introduced into the hub portion 40. It should be understood than any suitable bearings may be selected for assembly described and illustrated herein based on various considerations, including the types of bearings, the conditions the bearings will experience during planting operations, and other various considerations of the like.

In one instance, operator may introduce the upper bearing 62 into the hub portion 40 at the top end 40A of the hub portion 40. More particularly, the upper bearing 62 may be introduced into the first bore 54 at the open top end 40A of the hub portion 40. In this instance, the upper bearing 62 may be fastened with the hub portion 40 such that the inner circumferential wall 44 and the upper bearing 62 directly engage with one another and/or are press-fitted with one another. The upper bearing 62 may continue to be introduced into the first bore 54 and press-fitted with inner circumferential wall 44 until the first stop portion 48 ceases the movement of upper bearing 62. More particularly, upper bearing 62 may continue to be introduced into the first bore 54 and press-fitted with inner circumferential wall 44 until the first outer stop surface 48A of first stop portion 48 ceases the movement of upper bearing 62 inside of first bore 54.

In this same instance, operator may then introduce the lower bearing 64 into the hub portion 40 at the bottom end 40B of the hub portion 40. More particularly, the lower bearing 64 may be introduced into the second bore 56 at the open bottom end 40B of the hub portion 40. In this instance, the lower bearing 64 may be fastened with the hub portion 40 such that the inner circumferential wall 44 and the lower bearing 64 directly engage with one another and/or are press-fitted with one another. The lower bearing 64 may continue to be introduced into the second bore 56 and press-fitted with inner circumferential wall 44 until the second stop portion 50 ceases the movement of lower bearing 64. More particularly, lower bearing 64 may continue to be introduced into the second bore 56 and press-fitted with inner circumferential wall 44 until the second outer stop surface 50A of second stop portion 50 ceases the movement of lower bearing 64 inside of second bore 56.

It should be understood that the upper bearing 62 and the lower bearing 64 may be introduced into the hub portion 40 at any time. In one instance, lower bearing 64 may be introduced into the hub portion 40 simultaneously with the introduction of the upper bearing 62 with the hub portion 40. In another instance, lower bearing 64 may be introduced into the hub portion 40 subsequent to the introduction of the upper bearing 62 with the hub portion 40. In yet another instance, lower bearing 64 may be introduced into the hub portion 40 prior to the introduction of the upper bearing 62 with the hub portion 40.

Before both the upper bearing 62 and the lower bearing 64 are introduced into the hub portion 40, operator may introduce bearing spacer 70 into the hub portion 40. In one instance, the bearing spacer 70 may be introduced at the open top end 40A of the hub portion 40 and into the first bore 54 until the bearing spacer 70 directly abuts the lower bearing 64. In this instance, the lower bearing 64 was initially press-fitted into the hub portion 40 prior to press-fitting the upper bearing 62 with the hub portion 40. In another instance, the bearing spacer 70 may be introduced at the open bottom end 40B of the hub portion 40 and into the second bore 56 until the bearing spacer 70 directly abuts the upper bearing 62. In this instance, the upper bearing 62 was initially press-fitted into the hub portion 40 prior to press-fitting the lower bearing 64 with the hub portion 40.

Once the upper bearing 62 and the lower bearing 64 operably engage with the hub portion 40 and the bearing spacer 70 operably engages with both bearings 62, 64, the operator may then operably engage the gauge arm 20, the upper bearing 62, the lower bearing 64, and the bearing spacer 70 with lower shank 2 and a gauge arm of row unit 1 via first and second attachment assemblies 80, 90. In a first step, operator may pass the bolt 80A through the gauge arm 20, the upper bearing 62, the lower bearing 64, and the bearing spacer 70 and threadably engage the bolt 80A with the lower shank 2 of row unit 1 (see FIG. 4). In this same step, operator may add at least one or more shims 80C with the assembly 10 to set a desired distance between the assembly 10 and the lower shank 2 of the row unit 1 for planting operations.

In a second step (simultaneously with or subsequent to the first step mentioned above), operator may then threadably engage the bolt 90A with the gauge arm 20, via the threaded passageway 24B, and the gauge wheel of row unit 1. In this same step, operator may add at least one or more shims 90B with the assembly 10 to set a desired distance between the assembly 10 and the gauge wheel of the row unit 1 for planting operations.

FIG. 6 is a method 100 of engaging a gauge wheel arm assembly with a gauge wheel of a planter. Initial step 102 of method 100 may include inserting a first bearing of the gauge wheel arm assembly into a hub portion of a gauge wheel arm of the gauge wheel arm assembly. Another step 104 of method 100 may include engaging the first bearing with at least one stop portion of the hub portion inside of the hub portion. Another step 106 of method 100 may include inserting a second bearing of the gauge wheel arm assembly into the hub portion of the gauge wheel arm of the gauge wheel arm assembly. Another step 108 of method 100 may include engaging the second bearing with at least another stop portion of the hub portion inside of the hub portion, wherein the at least one stop portion and the at least another stop portion are separate and independent from one another inside of the hub portion. Another step 110 of method 100 may include engaging the gauge wheel arm assembly with the gauge wheel of the planter.

In other exemplary embodiments, method 100 may include additional steps and/or optional steps for engaging a gauge wheel arm assembly with a gauge wheel of a planter. Optional steps may further include inserting a bearing spacer of the gauge wheel arm assembly into the hub portion of the gauge wheel arm; and engaging the first bearing and the second bearing with the bearing spacer. An optional step may further include spacing the first bearing and the second bearing away from one another via a central gap defined between the at least one stop portion and the at least another stop portion. Optional steps may further include that wherein the step of engaging the first bearing with the at least one stop portion of the hub portion inside of the hub portion further includes that the first bearing engages with a first outer stop surface of the at least one stop portion; and wherein the step of engaging the second bearing with the at least another stop portion of the hub portion inside of the hub portion further includes that the second bearing engages with a second outer stop surface of the at least another stop portion separate and independent of the first outer surface. The method may further include that the first bearing is a single row bearing; and the second bearing is a double row bearing.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A gauge wheel arm assembly, comprising:
an arm portion; and
a hub portion operably engaged with the arm portion for receiving at least two bearings, the hub portion comprising:
at least one stop portion being integrally formed with and extending outwardly from an inner circumferential wall of the hub portion and being configured to operably engaged with a first bearing of the at least two bearings; and
at least another stop portion being integrally formed with and extending outwardly from an inner circumferential wall of the hub portion and being configured to operably engaged with a second bearing of the at least two bearings;
wherein the at least one stop portion and the at least another stop portion are independent and separate from one another by a central gap defined between the at least one stop portion and the at least another stop portion.

2. The gauge wheel arm assembly of claim 1, further comprising:
a bearing spacer positioned between the at least one stop portion and the at least another stop portion;
wherein the bearing spacer is configured to operably engaged with the at least two bearings inside of the hub portion.

3. The gauge wheel arm assembly of claim 2, wherein the bearing spacer comprises:
an upper engagement surface configured to engage with the first bearing of the at least two bearings; and a lower engagement surface opposite to the upper engagement surface and configured to engaged with the second bearing of the at least two bearings.

4. The gauge wheel arm assembly of claim 1, wherein the hub portion comprises:

a first outer stop surface defined on the at least one stop portion; and a first inner stop surface defined on the at least one stop portion opposite to the first outer stop surface;

wherein the first outer stop surface is configured to engage with the first bearing of the at least two bearings.

5. The gauge wheel arm assembly of claim 4, wherein the hub portion comprises:

a second outer stop surface defined on the at least another stop portion and facing away from the first outer stop surface; and a second inner stop surface defined on the at least one another portion opposite to the second outer surface and facing towards the first inner stop surface;

wherein the second outer stop surface is configured to engage with the second bearing of the at least two bearings.

6. The gauge wheel arm assembly of claim 5, wherein the hub portion comprises:

a central gap defined between the first inner stop surface of the at least one stop portion and the second inner stop surface of the at least another stop portion;

wherein the first inner stop surface and the second inner stop surface are separated from one another at the central gap.

7. The gauge wheel arm assembly of claim 2, wherein the hub portion further comprises:

a top end;

a bottom end vertically opposite to the top end;

an inner circumferential wall extending between the top end and the bottom end; and a first bore defined by the inner circumferential wall and extends between the top end and the at least one stop portion;

wherein the first bore is configured to receive the first bearing of the at least two bearings.

8. The gauge wheel arm assembly of claim 7, wherein the inner circumferential wall is continuous and uninterrupted between the top end and the bottom end.

9. The gauge wheel arm assembly of claim 7, wherein the hub portion further comprises:

a second bore defined by the inner circumferential wall and extends between the bottom end and the at least another stop portion;

wherein the second bore is defined vertically below the first bore; and wherein the second bore is configured to receive the second bearing of the at least two bearings.

10. The gauge wheel arm assembly of claim 9, wherein the hub portion further comprises:

a third bore defined by the at least one stop portion and the at least another stop portion;

wherein the third bore is defined between the first bore and the second bore; and wherein the third bore is configured to receive a portion of the first bearing, a portion of the second bearing, and the bearing spacer.

11. The gauge wheel arm assembly of claim 9, wherein the first bearing is a single row bearing configured to be received by the first bore; and wherein the second bearing is a double row bearing configured to be received by the second bore.

12. The gauge wheel arm assembly of claim 9, wherein the hub portion further comprises:

a first length of the first bore defined between the top end and the at least one stop portion; and a second length of the second bore defined between the bottom end and the at least another stop portion;

wherein the second length is greater than the first length.

13. The gauge wheel arm assembly of claim 1, further comprising:

a first end of the arm portion operably engaged with the hub portion;

a second end of the arm portion opposite to the first end of the arm portion and operably engaged with the hub portion; and a threaded passageway defined at the first end of the arm portion.

14. The gauge wheel arm assembly of claim 13, wherein the arm portion further comprises:

a first arm section extending from the first end and towards the second end of the arm portion;

a second arm section extending from the first arm section and towards the second end of the arm portion;

a third arm section extending from the second arm section and towards the second end of the arm portion and being positioned above the first arm section;

a fourth arm section extending from the third arm section to the second end of the arm portion;

a fifth arm section extending from the fourth arm section and towards the second end of the arm portion and being positioned below the first arm section and the third arm section; and a sixth arm section extending from the fifth arm section to the second end of the arm portion and being operably engaged with the hub portion.

15. A method of engaging a gauge wheel arm assembly with a gauge wheel of a planter, comprising steps of:

inserting a first bearing of the gauge wheel arm assembly into a hub portion of a gauge wheel arm of the gauge wheel arm assembly;

engaging the first bearing with at least one stop portion of the hub portion inside of the hub portion, wherein the at least one stop portion being integrally formed with and extending outwardly from an inner circumferential wall of the hub portion;

inserting a second bearing of the gauge wheel arm assembly into the hub portion of the gauge wheel arm of the gauge wheel arm assembly;

engaging the second bearing with at least another stop portion of the hub portion inside of the hub portion, wherein the at least another stop portion being integrally formed with and extending outwardly from the inner circumferential wall of the hub portion, and wherein the at least one stop portion and the at least another stop portion are separate and independent from one another inside of the hub portion by a central gap defined between the at least one stop portion and the at least another stop portion; and engaging the gauge wheel arm assembly with the gauge wheel of the planter.

16. The method of claim 15, further comprising:

inserting a bearing spacer of the gauge wheel arm assembly into the hub portion of the gauge wheel arm; and engaging the first bearing and the second bearing with the bearing spacer.

17. The method of claim 15, wherein the step of engaging the first bearing with the at least one stop portion of the hub portion inside of the hub portion further includes that the first bearing engages with a first outer stop surface of the at least one stop portion; and wherein the step of engaging the second bearing with the at least another stop portion of the hub portion inside of the hub portion further includes that the second bearing engages with a second outer stop surface of the at least another stop portion separate and independent of the first outer surface.

18. The method of claim 15, wherein the first bearing is a single row bearing; and wherein the second bearing is a double row bearing.

19. A gauge wheel arm assembly, comprising:

an arm portion; and a hub portion operably engaged with the arm portion for receiving at least two bearings, the hub portion comprising:

at least one stop portion configured to operably engaged with a first bearing of the at least two bearings, the at least one stop portion having:

a first outer stop surface; and a first inner stop surface defined opposite to the first outer stop surface;

wherein the first outer stop surface is configured to engage with the first bearing of the at least two bearings; and at least another stop portion configured to operably engaged with a second bearing of the at least two bearings, the at least another stop portion having:

a second outer stop surface facing away from the first outer stop surface; and a second inner stop surface defined opposite to the second outer surface and facing towards the first inner stop surface;

wherein the second outer stop surface is configured to engage with the second bearing of the at least two bearings;

wherein the at least one stop portion and the at least another stop portion are independent and separate from one another.

* * * * *